(12) United States Patent
Koch

(10) Patent No.: US 9,241,574 B2
(45) Date of Patent: Jan. 26, 2016

(54) FURNITURE CONTROL AND PIECE OF SEATING FURNITURE

(71) Applicant: LOGICDATA Electronic & Software Entwicklungs GmbH, Deutschlandsberg (AT)

(72) Inventor: Walter Koch, Schwanberg (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 81 days.

(21) Appl. No.: 14/106,652

(22) Filed: Dec. 13, 2013

(65) Prior Publication Data

US 2014/0197666 A1 Jul. 17, 2014

Related U.S. Application Data

(60) Provisional application No. 61/754,541, filed on Jan. 19, 2013.

(30) Foreign Application Priority Data

Dec. 21, 2012 (DE) .......................... 10 2012 112 905

(51) Int. Cl.
*A47C 7/62* (2006.01)
*A47C 7/50* (2006.01)
(Continued)

(52) U.S. Cl.
CPC . *A47C 7/506* (2013.01); *A47C 7/62* (2013.01); *A47C 31/008* (2013.01); *G06F 3/041* (2013.01)

(58) Field of Classification Search
CPC .......... A47C 31/008; A47C 7/62; A47C 7/72; A47C 7/506; G06F 3/041

USPC ....................................................... 297/217.3
See application file for complete search history.

(56) References Cited

U.S. PATENT DOCUMENTS

2007/0052267 A1 * 3/2007 Dodd .......................... 297/217.3
2008/0262657 A1 * 10/2008 Howell et al. .................. 700/275
(Continued)

FOREIGN PATENT DOCUMENTS

DE 102007018647 A1 * 10/2008
DE 102011102439 11/2012
(Continued)

*Primary Examiner* — Milton Nelson, Jr.
(74) *Attorney, Agent, or Firm* — McDermott Will & Emery LLP

(57) ABSTRACT

A furniture control (100) for the installation into an electrically adjustable piece of seating furniture (200) comprises a control housing (10) that contains control components for activating motors of the piece of seating furniture and features a recess (15) into which an operating part (20) can be inserted, the operating part and a sensor for detecting whether the operating part (20) is inserted into the control housing (10). The operating part features a flat sensor module (30) with a touch-sensitive surface. The operating part (20) is designed for detecting a respective position-dependent touch actuation of the surface of the sensor module (30) and for generating a respective actuation signal for the control components based on a detected touch actuation. The operating part (20) is furthermore designed for generating a first number of different actuation signals for the control components when the operating part (20) is inserted into the control housing (10) and for generating a second number of different actuation signals for the control components when the operating part (20) is not inserted into the control housing (10), wherein the second number is greater than the first number.

16 Claims, 2 Drawing Sheets

Figure 1:
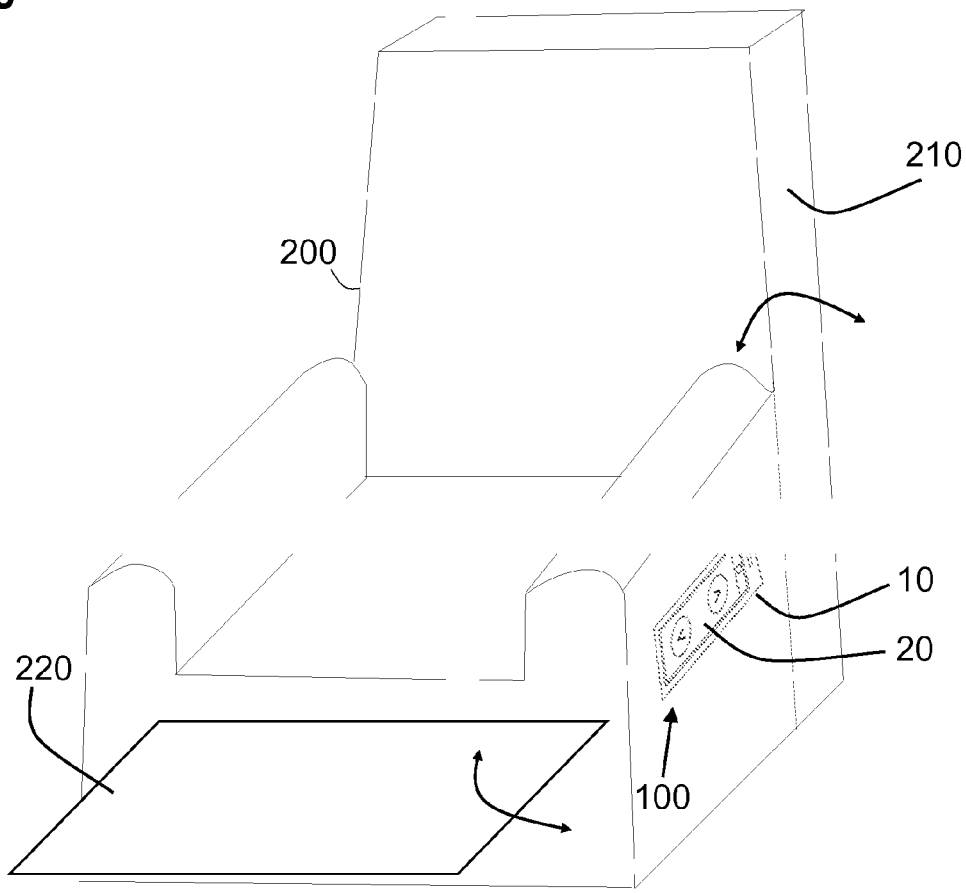

(51) Int. Cl.
*A47C 31/00* (2006.01)
*G06F 3/041* (2006.01)

(56) References Cited

U.S. PATENT DOCUMENTS

2010/0176632 A1* 7/2010 Alford et al. ............... 297/217.3
2011/0174926 A1* 7/2011 Margis et al. .............. 244/118.6
2012/0118718 A1 5/2012 Geiger et al.
2013/0106164 A1* 5/2013 Chacon et al. ............. 297/463.1
2013/0169065 A1 7/2013 Koch et al.

FOREIGN PATENT DOCUMENTS

| WO | WO-2007/116146 A1 | 10/2007 |
| WO | 2007/124754 A2 | 11/2007 |
| WO | 2008/128250 A1 | 10/2008 |
| WO | WO-2010/058105 A1 | 5/2010 |
| WO | WO-2012/061406 A2 | 5/2012 |

* cited by examiner

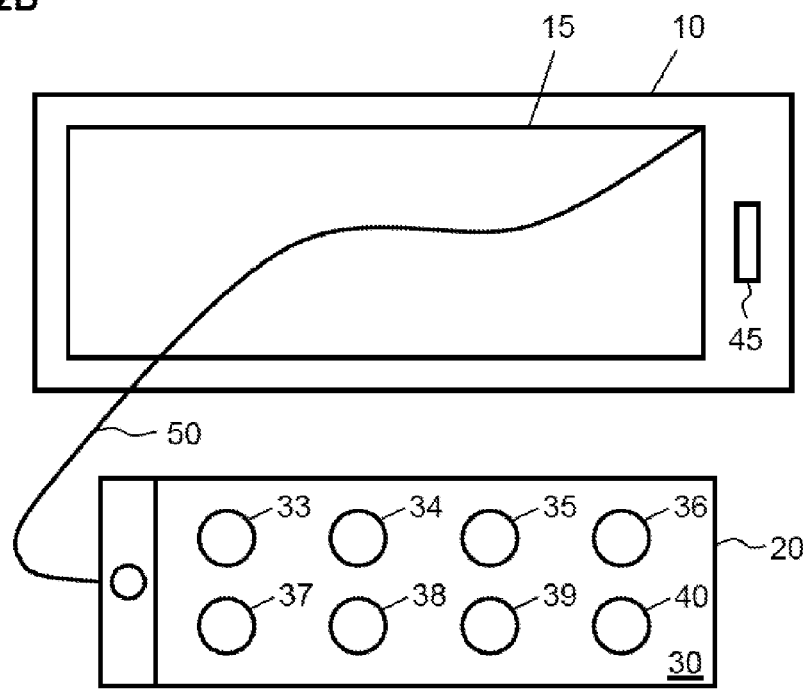
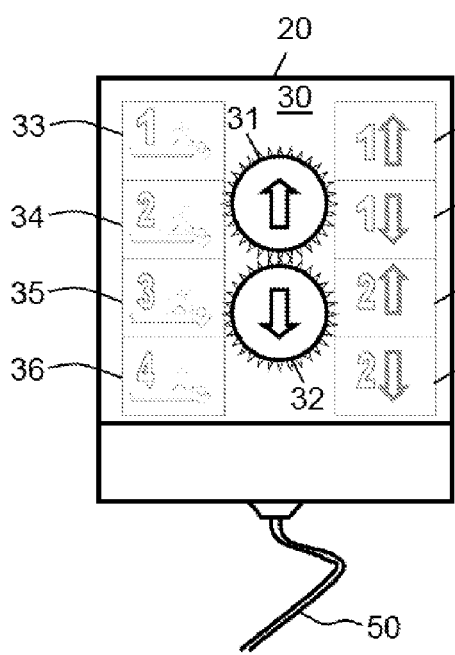
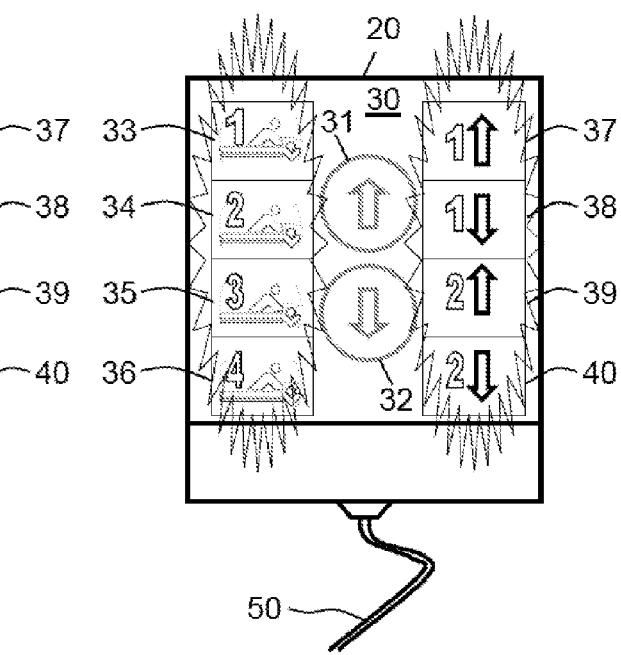

FURNITURE CONTROL AND PIECE OF SEATING FURNITURE

CROSS-REFERENCES TO RELATED APPLICATIONS

The present application claims the benefit of priority under 35 U.S.C. §119 from U.S. Provisional Patent Application Ser. No. 61/754,541, filed on Jan. 19, 2013, and claims priority to German Patent Application No. 102012112905.3 filed on Dec. 21, 2012, both disclosures of which are hereby incorporated by reference in their entirety for all purposes.

The invention pertains to a furniture control for the installation into an electrically adjustable piece of seating furniture, as well as an electrically adjustable piece of seating furniture with such a furniture control.

Adjustable furniture, in particular electrically adjustable seating furniture, is widely used nowadays. For example, seating furniture such as chairs or armchairs, in which the inclination of the backrest can be electrically adjusted, is offered for sale.

In addition to corresponding adjusting motors and a control for the activation of these motors, operating elements or operating parts are provided, by means of which a user of the piece of furniture can carry out the desired adjustments. Such an operating part may be integrated into a control or arranged remote from the control such that the operating part can be individually positioned.

In conventional operating parts, the design of an operating interface for the user is usually predefined, for example, by the fixed positioning of touch contact elements in the operating part such that, among other things, the circuit board layout of a circuit board on which the touch contact elements are mounted and the design of a housing of the operating part are also predefined. Particularly in adjustable pieces of furniture that have more than one adjustable function such as, for example, up and down, the operating interface of conventional operating parts features all operating functions, wherein the operation can therefore be more complex for the user.

An objective to be achieved consists of disclosing a more flexible concept for a furniture control that allows, in particular, an individually adapted operation.

This objective is achieved with the subject-matter of the independent claims. Embodiments and enhancements form the subject-matter of the dependent claims.

The more flexible concept is based on the notion that the operation of an electrically adjustable piece of seating furniture is subject to different requirements with respect to an operating interface of an operating part. For example, simple and frequently used adjustment functions merely require, in a manner of speaking, a blind operation of an operating part of the furniture control, i.e. without looking at the operating interface. For more special functions, however, it is desirable to provide a more extensive operating interface that usually also requires a visual contact. According to the more flexible concept, it is accordingly proposed to realize the furniture control in such a way that in one operating mode, the operating part is inserted into a recess of a housing of the furniture control and operated therein, while in a second operating mode, the operating part is respectively removed from the recess or not completely inserted into the recess, wherein different operating options are available in the second operating mode. In this case, the operating part may be realized in such a way that different operating zones are optically signaled and can be actuated in the different operating modes. In this case, the housing with the recess is intended for the direct installation into the piece of seating furniture and features all control components for the actuation of different motors of the piece of seating furniture.

Since the control components are integrated into the control housing, the furniture control can also be installed into the piece of seating furniture, as well as removed for maintenance or repair purposes, with little effort, particularly manufacturing effort.

In one embodiment of the more flexible concept, a furniture control for the installation into an electrically adjustable piece of seating furniture is provided and comprises a control housing and an operating part. The control housing that contains control components for the actuation of motors of the piece of seating furniture features a recess, into which the operating part can be inserted. The operating part features a flat sensor module with a touch-sensitive surface and is designed for detecting a respectively position-dependent touch actuation of the surface of the sensor module and for generating a respective actuation signal for the control components based on a detected touch actuation. The furniture control furthermore comprises a sensor for detecting whether the operating part is inserted into the control housing. In this case, the operating part is designed for generating a first number of different actuation signals for the control components when the operating part is inserted into the control housing and for generating a second number of different actuation signals for the control components when the operating part is not inserted into the control housing, wherein the second number is preferably greater than the first number.

For example, only single touch actuations that allow a basic operation, particularly without requiring visual contact, are evaluated in the inserted state of the operating part. In the non-inserted or removed state of the operating part, several touch actuations can be evaluated such that preferably all functions of the furniture control or of the adjustable piece of seating furniture can be utilized.

In the inserted state, for example, the operating part is positioned in the recess in a largely form-fitting fashion. In the non-inserted state, for example, the operating part is completely removed from the recess. However, it is also possible that the operating part is merely pivoted out of the recess in order to be transferred into the non-inserted state.

The potential detectable touch actuations include selective touch actuations, as well as touching motions on the surface such as moving over the surface with one or more fingers. For example, the sensor module is respectively realized, in particular, for multiple touch actuations or in the form of a multitouch sensor module.

The operating part and the control housing form an integrated unit that can also be optically integrated into the piece of seating furniture more easily. Due to the ability to insert the operating part into the recess of the control housing, a fixed or defined space is respectively also provided for the operating part, wherein this in turn simplifies the handling of a thus equipped piece of seating furniture.

In one embodiment, the operating part is designed for optically signaling several operating zones on the surface of the sensor module, for detecting a respective touch actuation of the operating zones and for generating a respective actuation signal for the control components based on a detected touch actuation. The operating part is designed for signaling no operating zones or a first number of operating zones when the operating part is inserted into the control housing and for signaling a second number of operating zones when the operating part is not inserted into the control housing, wherein the second number of operating zones is greater than the first number of different actuation signals.

Consequently, the signaling of operating zones may take place either in the removed state only or in both states. An operation in the inserted state therefore is also possible without signaled operating zones.

The sensor module is designed, for example, for sensing a position of a touch actuation on the surface and for generating a respective actuation signal based on one or more sensed positions. Particularly an allocation of a touch actuation to a potential signaled operating zone is achieved in this way.

The operating zones may represent, for example, a mechanical touch contact, but also a slide control or the like. If it is designed accordingly, the sensor module makes it possible, in particular, to model any mechanical or electromechanical operating elements, namely in the form of a display, as well as in the evaluation.

In different embodiments of the furniture control, the operating part additionally features an electromechanical switching element such as, for example, a microswitch. The switching element can be actuated by pressing on the surface of the sensor module. In this case, the operating element is designed to also generate the respective actuation signal for the control components based on a detected actuation of the switching element. For example, a selection of the operating zone is carried out by touching the surface at the corresponding location, wherein the switching element is also actuated by correspondingly pressing on the surface or the sensor module. The generation of the actuation signal may be dependent on the pressing or actuating of the switching element. For example, the actuation signal is only sent to the control components if the switching element is also actuated.

However, it would also be possible that a first actuation signal for the control components is generated in response to a touch actuation on the sensor module when the switching element is not actuated, and that a second actuation signal for the control components is generated when the switching element is actuated.

In certain situations such as, for example, in the inserted state, the dependence on the actuation of the electromechanical switching element can prevent an unintentional touch of the sensor module from leading to the triggering of a control function. For example, it may accordingly be required that the user actuates the switching element by pressing on the sensor module and in this way purposefully confirms the triggering of the control function with the corresponding actuation signal. In the removed state, it is also possible to forgo the actuation of the switching element because the user usually also has visual contact with the surface of the sensor module in this case.

For example, the sensor module features a touchscreen that is realized, in particular, in a transparent fashion. In this case, it is not absolutely imperative that the touchscreen has a display function, but merely that is able to detect touch actuations on the surface of the sensor module as positionally accurate as possible.

In one embodiment with a touchscreen, for example, the sensor module features a marking for operating zones that can be signaled, wherein the signaling takes place by activating a corresponding backlighting. For example, a printed or otherwise marked plate or film is provided in the sensor module and arranged underneath or above the preferably transparent touchscreen. The marking is realized, for example, such that it becomes clearly visible for a user due only to the backlighting. Consequently, different markings can be illuminated in order to thus signal operating zones depending on the state of insertion of the operating part. An evaluation of the actuation of the operating zones is carried out by means of the touchscreen.

In another embodiment with a touchscreen, the sensor module features a controllable graphic display for signaling the operating zones. Such a graphic display comprises, for example, a liquid crystal display or the like. The graphic display may, in particular, also comprise a small screen, particularly a flat screen. In this case, the preferably transparent touchscreen once again is preferably arranged underneath or above the display or screen such that the signaling of the operating zones is realized by the display or screen while the evaluation of the actuation of the operating zones is carried out with the aid of the touchscreen.

The touchscreen operates, for example, according to the principle of a resistive, capacitive or inductive touchscreen. Touching the touchscreen therefore leads to a change in the electrical properties of the touchscreen that can be detected with conventional evaluation methods.

The sensor for detecting whether the operating part is inserted into the control housing comprises, for example, a microswitch, a magnetic sensor or an optical sensor.

In one embodiment with a microswitch, for example, this microswitch is respectively arranged in the control housing or in or on the recess such that the microswitch is mechanically actuated by the inserted operating part.

In one embodiment with a magnetic sensor, the magnetic sensor is either provided in the operating part or in the control housing on the recess, wherein the magnetic sensor detects whether the corresponding counterpart is present in order to detect the inserted state. For example, a magnet is provided in the operating part, and in the inserted state it lies in immediate proximity to a magnetic sensor provided in or on the recess in the interior of the control housing. The magnetic sensors used may consist of magnetoresistive sensors or Hall sensors or other known magnetic sensors.

In one embodiment with an optical sensor, the sensor is provided, for example, in the control housing on the recess, wherein the sensor detects whether the corresponding counterpart is present based on a measured brightness or the like in order to detect the inserted state.

In different embodiments of the furniture control, the actuation signals are transmitted from the operating part to the control components in a wireless fashion or by means of a cable.

In one embodiment of the furniture control with a cable, the furniture control furthermore features a cable retracting mechanism for a cable between the operating part and the control housing. The mechanism may be arranged in the operating part and/or in the control housing and, for example, is spring-based. Due to this mechanism, it is possible to retract the cable during the insertion into the recess of the control housing in order to thus prevent the cable from hanging freely. The mechanism may be actuated manually or allow an automatic retraction.

In different embodiments, the furniture control also makes it possible to realize another functionality in addition to an adjusting function for the piece of seating furniture. For example, a comfort function that can be provided such as, e.g., a massage function of the piece of seating furniture with corresponding massaging motors can be activated by means of the furniture control. Other comfort functions include, for example, a seat heater, audio functions, the control of an external voltage supply or the like.

For example, the operating zones for activating the comfort function are only signaled in the non-inserted state of the operating part. An activation of the comfort function accordingly only takes place in the non-inserted state of the operating part.

In different embodiments, the control housing features at least one Universal Serial Bus or USB port, by means of which a connected device can be supplied with power. Alternatively or additionally, a control or programming of the furniture control, for example, for installation or maintenance purposes, may also be realized with the aid of the USB port.

In different embodiments, the furniture control features a wireless module that is based, in particular, on a WLAN or Bluetooth standard, wherein the control components are designed for receiving actuation signals via the wireless module. In this way, functions of the piece of seating furniture can not only be controlled with the operating part, but also with an external device such as a mobile device or the like.

In one embodiment of an electrically adjustable piece of seating furniture, the piece of seating furniture comprises a furniture control according to one of the above-described embodiment examples. In this case, the control housing is installed into the piece of seating furniture, particularly into an armrest or a tray of the piece of seating furniture. For example, the installation takes place laterally into an armrest of the piece of seating furniture such that an actuation of the operating zones does not unintentionally take place when an arm or the like is placed on the armrest.

The piece of seating furniture may consist, for example, of a chair, an armchair, particularly a lounge chair, a sofa, a couch or a bed. As mentioned above, the piece of seating furniture may have different adjusting functions, but in addition also other comfort functions such as a massage function or the like.

Several embodiment examples of the invention are described in greater detail below with reference to the figures. In these figures, elements with respectively identical function or operation are identified by the same reference symbols. If individual elements are described with reference to one of the figures, their description is not necessarily repeated with reference to the following figures.

Figure 2A:
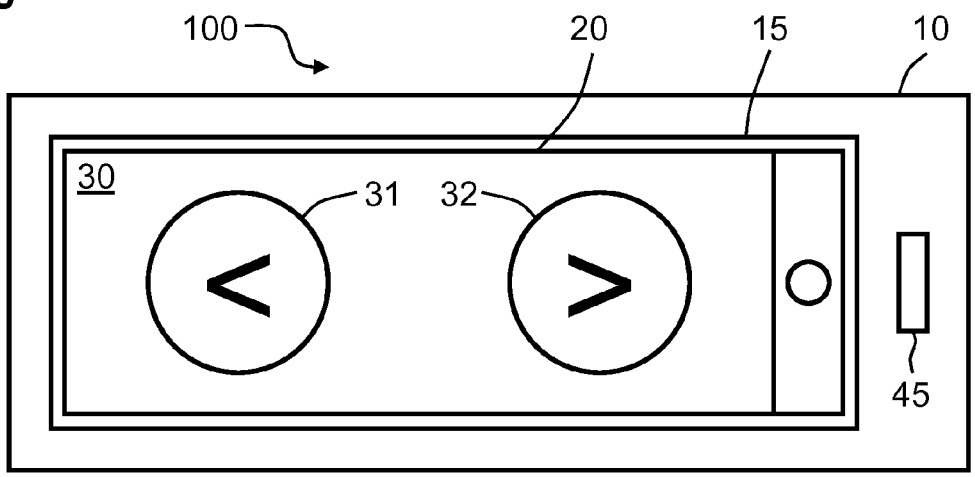

In these figures:

FIG. 1 shows an embodiment of an electrically adjustable piece of seating furniture with an installed furniture control, FIGS. 2A and 2B show illustrations of an embodiment of a furniture control, and FIGS. 3A and 3B show illustrations of an embodiment of an operating part.

FIG. 1 shows an embodiment of an electrically adjustable piece of seating furniture 200 that, as an example, is illustrated in the form of an armchair with an adjustable backrest 210. The armchair 200 furthermore features an adjustable footrest 220. Internally arranged motors that carry out the adjusting function are not visible. In addition, the armchair 200 has at least one controlled comfort function such as, for example, a massage function, into which one or more massaging motors are additionally integrated. These massaging motors are also not illustrated in order to provide a better overview. Other comfort functions include, for example, a seat heater, audio functions, the control of an external voltage supply or the like.

A furniture control 100 is integrated into the lateral area of an armrest of the armchair 200. The furniture control 100 features a control housing 10, as well as an operating part 20 that is arranged in a recess of the control housing 10. The operating part 20 comprises a sensor module with a touch-sensitive surface, on which two operating zones for an upward motion and for a downward motion are illustrated in FIG. 1. The control housing 10 of the furniture control 100 preferably contains all control components that serve for actuating the different motors of the armchair 200. Such control components conventionally comprise, among other things, adapted power electronics, by means of which the motors are respectively supplied with a current or voltage. The control components furthermore comprise, for example, a microcontroller and/or other logical components that allow a simple operation of the armchair 200. The control components particularly evaluate corresponding actuation signals that are generated in the operating part 20 upon a corresponding touch actuation or actuation of an operating zone. The operating part 20 can be removed from the recess of the control housing 10 as described in greater detail below.

It should be noted that the illustration of the armchair 200 merely serves as an example for an electrically adjustable piece of seating furniture and that such pieces of seating furniture also include chairs, sofas, seating ensembles, beds or the like.

FIGS. 2A and 2B show different illustrations of a furniture control 100, wherein the operating part 20 is inserted into the control housing 10 in FIG. 2A and either removed from the control housing 10 or not inserted into the control housing 10 in FIG. 2B.

For this purpose, the control housing 10 comprises a recess 15 that is precisely realized such that the operating part 20 can be respectively accommodated or inserted therein. The operating part 20 is connected to the control housing 10 via a cable 50 as illustrated, in particular, in FIG. 2B. A corresponding cable retracting mechanism is preferably provided in the operating part 20 or in the control housing 10 in order to retract the cable 50 and thus prevent the cable 50 from hanging freely in the inserted state of the operating part 20. In other embodiments, the cable 50 can also be eliminated, in which case the transmission of actuation signals takes place in a wireless fashion.

In the embodiment shown, a USB port 45 provided in the control housing 10 makes it possible to supply a device connected to it with power, for example, in order to charge a mobile telephone or another mobile device. Alternatively or additionally, a control or programming of the furniture control can also be realized by means of the USB port. In other embodiments, several USB ports may be provided, or the USB port 45 may also be eliminated. In this case, the programming of the furniture control takes place, for example, beforehand during the manufacture or via a separate programming interface.

The operating part 20 features a flat sensor module 30 with a touch-sensitive surface, on which several operating zones can be optically signaled. In the illustration in FIG. 2A, for example, two operating zones 31, 32 are signaled with corresponding arrows that are respectively suggestive, e.g., of an upward motion and a downward motion of the chair. As an example, eight operating zones 33, 34, 35, 36, 37, 38, 39, 40 that allow other operating functions of the armchair 200 are signaled in the illustration in FIG. 2B.

The different signaling of the respective operating zones 31, 32 and 33, . . . , 40 is based on the furniture control 100 featuring a sensor, not depicted, for detecting whether the operating part 20 is inserted into the control housing 10. In this case, the operating part is designed for signaling a different number or arrangement of operating zones depending on whether or not the operating part is inserted.

In more general terms, the operating part is in this embodiment designed for signaling no operating zones or a first number of operating zones 31, 32 when the operating part 20 is inserted into the control housing 10, and for signaling a second number of operating zones 33, . . . , 40 when the operating part 20 is not inserted into the control housing 10. In this case, the second number is preferably greater than the first number. In this embodiment, the choice of two operating zones for the inserted state and eight operating zones for the removed or non-inserted state merely serves as an example and can be varied according to the desired functions of the furniture control.

Particularly in the inserted state, it is possible to completely forgo the signaling of operating zones such that actuating signals are generated based only on detected touch actuations. This is particularly advantageous for an operation without visual contact with the sensor module.

The potential touch actuations that can be detected include selective touch actuations, as well as touching motions on the surface such as moving over the surface with one or more fingers. For example, the sensor module 30 is in this case respectively realized, in particular, for multiple touch actuations or in the form of a multitouch sensor module.

Due to the touch-sensitive surface of the sensor module 30, the operating part is designed for detecting a respective actuation of the signaled operating zones 31, . . . , 40 and for generating a respective actuation signal for the control components based on a detected actuation. For this purpose, the sensor module 30 features, for example, a touchscreen that is respectively arranged underneath its surface or surfaces and makes it possible to determine the position of a touch actuation. Upon a corresponding touch actuation at a location at which one of the operating zones 31, . . . , 40 is signaled, for example, an actuation signal that is assigned to this operating zone is generated. The touchscreen may be realized in any conventional fashion in the form of a resistive, inductive or, in particular, capacitive measuring arrangement.

The sensor for detecting whether the operating part 20 is inserted into the control housing 10 comprises, for example, at least one microswitch, one magnetic sensor or one optical sensor. For example, a corresponding microswitch is provided in the region of the recess 15, wherein said microswitch is actuated during the insertion of the operating part 20 and thus signals the inserted state. In an embodiment with a magnetic sensor, this magnetic sensor is provided, for example, on the edge of the recess 15, wherein the operating part 20 preferably consists of a corresponding magnetic material or is equipped with a permanent magnet at the corresponding location. The magnetic sensor therefore makes it possible to detect whether the operating part 20 is inserted into the recess 15. The arrangement of the magnet and the magnetic sensor may also be interchanged. The magnetic sensors used may consist, for example, of Hall sensors, magnetoresistive sensors or other magnetic sensors. In an embodiment with an optical sensor, the sensor is provided, for example, in the control housing 10 on the recess 15, wherein the sensor detects whether the corresponding counterpart is present based on a measured brightness or the like in order to detect the inserted state.

In the embodiment illustrated in FIGS. 2A and 2B, the signaling of the operating zones 31, . . . , 40 is realized by means of a controllable graphic display that is realized, for example, in the form of a liquid crystal display or a comparable display. Consequently, different graphics that represent the operating zones 31, . . . , 40 can be illustrated for the inserted state and the non-inserted state by means of the graphic display. The touchscreen is preferably transparent and arranged above or underneath the graphic display.

The functions assigned to the different operating zones may be chosen arbitrarily. For example, a separate adjustment of the backrest 210 and of the footrest 220 is realized with the operating zones 33, . . . , 40. For example, four of the eight operating zones are selected for this purpose. Certain preprogrammed sitting positions or other comfort functions of the armchair 200 can be selected with the remaining operating zones. For example, the armchair features one or more massaging motors that are activated by corresponding programs in the control components. The selection of the different programs can be carried out with one or more of the operating zones. The operating zones can also be changed interactively, particularly in the removed state of the operating part 20. For example, the graphic display with the operating zones is changed when one of the operating zones is actuated in order to offer the user additional options. It should be noted that the shape and partition of the operating zones 31, . . . , 40 merely serve as examples and may, in particular, have other visual and operational designs.

In special embodiments of the operating part, the sensor module features one or more electromechanical switching elements that can be actuated by pressing on the surface of the sensor module 30. For example, the graphic display and the touchscreen are movably supported in the operating part 20 and prestressed, e.g., with one or more springs. The electromechanical switching element or electromechanical switching elements is/are arranged underneath the surface such that a mechanical contact with the switching element is produced by pressing on the surface.

The evaluation of whether the switching element is actuated can be additionally utilized for the generation of the actuation signal for the control components. For example, an actuation signal that leads to an actual adjustment of the armchair 200 may be dependent on the switching element being actuated such that no corresponding actuation signal is sent to the control components if a touch actuation of the operating zone is detected without an actuation of the switching element. This may be advantageous, for example, when the operating part 20 is inserted into the control housing 10 and a user seated in the armchair has no direct visual contact with the surface. The triggering of a function due to an inadvertent touch is therefore prevented. When pressing the switching element, the user also receives a tactile feedback that allows a simplified operation.

In the removed state of the operating part 20, this dependence may likewise be implemented, but other combinations can also be realized with the actuated switching element. For example, a changed display is triggered by an actuation of an operating zone without an actuation of the switching element, wherein this is implemented, for example, in the form of a first actuation signal that is sent to the control components, but does not lead to an adjusting function. If the user actuates the switching element once the operating zone has been selected, for example, the previously displayed function is actually carried out, wherein this is implemented with a second actuation signal for the control components.

FIG. 3A and FIG. 3B show different views of another embodiment of the operating part 20, particularly the sensor module 30. In other respects, however, we refer to the preceding explanations.

In this embodiment, the sensor module 30 features a marking for operating zones 31, . . . , 40 that can be signaled, wherein the signaling is realized with the activation of a corresponding backlighting. For this purpose, the sensor module features, for example, a printed or otherwise marked plate or film that is arranged underneath or above a touchscreen. The different operating zones 31, . . . , 40 are correspondingly marked on the plate or film, wherein a backlighting is respectively provided for each of the operating zones or for groups of operating zones.

FIG. 3A shows the operating part 20 in an inserted state, in which the operating zones 31, 32 are illuminated. In functional terms, this essentially corresponds to the illustration of the operating zones 31, 32 in FIG. 2A. The remaining marked operating zones 33, ..., 40 are not illuminated and are accordingly not signaled. In the state illustrated in FIG. 3A, it is therefore only possible to actuate the operating zones 31, 32, but not the remaining operating zone 33, ..., 40.

Analogous to FIG. 2B, FIG. 3B shows the operating element 20 in the non-inserted state, in which the operating zones 31, 32 are not illuminated and are therefore not signaled. However, the operating zones 33, ..., 40 are now illuminated by the backlighting and are signaled. In this state, it is therefore only possible to actuate the operating zones 33, ..., 40, but not the operating zones 31, 32.

The operating zones 31, ..., 40 may be marked with different symbols or numbers or the like. As an example, the operating zones 31, 32 are marked with arrows that in the inserted state of the operating part 20 allow an upward and a downward adjustment of the armchair 200 or the backrest 210 and/or of the footrest 220. In the removed, non-inserted state of the operating part 20, for example, an individual adjustment of the backrest 210 and of the footrest 220 can be carried out with the operating zones 37, 38, 39, 40. Different massage programs are assigned to the operating zones 33, 34, 35, 36.

The embodiment of the operating part 20 or sensor module 30 illustrated in FIGS. 3A and 3B can also be combined with the above-described electromechanical switching element such that the generation of actuation signals may also be dependent on the actuation of the switching element.

The operation of the operating part by means of the touch-sensitive sensor module allows an individual design of the operating interface or the operating zones of the operating element 20. In the variation with a graphic display as it is illustrated in FIGS. 2A and 2B, the operating zones that can be displayed or signaled can also be individually changed during the operation. In the variation with a marked or printed plate or film that is illustrated in FIGS. 3A and 3B, an alternative operating scenario can be realized by simply exchanging this plate or film. This allows a flexible and cost-efficient implementation of the operating part.

In different embodiments, the furniture control 100 features a wireless module that is based, in particular, on a WLAN or Bluetooth standard, wherein the control components are designed for receiving actuation signals via the wireless module. In this way, functions of the piece of seating furniture can not only be controlled with the operating part 20, but also with an external device such as a mobile device, particularly a mobile telephone or tablet or the like.

In the described embodiments, the operating part 20 in the inserted state is positioned in the recess 15, for example, in a largely form-fitting fashion. In the non-inserted state, the operating part 20 is, for example, completely removed from the recess 15. However, it would also be possible that the operating part 20 is merely pivoted out of the recess 15, for example with a pivoting mechanism, in order to be transferred into the non-inserted state.

What is claimed is:

1. A furniture control for installation into an electrically adjustable piece of seating furniture, with the furniture control comprising,
    a control housing that contains control components for an activation of motors of the piece of seating furniture, and that comprises a recess, into which an operating part can be inserted;
    the operating part that comprises a flat sensor module with a touch-sensitive surface and is designed for detecting a respective position-dependent touch actuation of the surface of the sensor module and for generating a respective actuation signal for the control components based on a detected touch actuation; and
    a sensor for detecting whether the operating part is inserted into the control housing,
    wherein the operating part is designed for generating a first number of different actuation signals for the control components when the operating part is inserted into the control housing and for generating a second number of different actuation signals for the control components when the operating part is not inserted into the control housing, and
    wherein the second number is greater than the first number.

2. The furniture control according to claim 1, wherein the sensor module comprises a transparent touchscreen.

3. The furniture control according to claim 1, wherein the sensor for detecting whether the operating part is inserted into the control housing comprises at least one of the following:
    a microswitch;
    a magnetic sensor; or
    an optical sensor.

4. The furniture control according to claim 1, wherein the control housing comprises at least one Universal Serial Bus or USB port, by which a connected device can be supplied with power and/or by which the furniture control can be controlled or programmed.

5. The furniture control according to claim 1, further comprising a wireless module that is based, in particular, on a WLAN or Bluetooth standard, wherein the control components are designed for receiving actuation signals via the wireless module.

6. An electrically adjustable piece of seating furniture with a furniture control according to claim 1, wherein the control housing is installed into the piece of seating furniture, particularly an armrest of the piece of seating furniture.

7. The furniture control according to claim 1, wherein the actuation signals are transmitted from the operating part to the control components in a wireless fashion or via a cable.

8. The furniture control according to claim 7, wherein the operating part is connected to the control housing via a cable, and further comprises a cable retracting mechanism for the cable that is arranged in the operating part and/or in the control housing.

9. The furniture control according to claim 1, wherein the control components are designed for activating a comfort function of the piece of seating furniture.

10. The furniture control according to claim 9, wherein an activation of the comfort function takes place only in the non-inserted state of the operating part and based on a detected touch actuation.

11. The furniture control according to claim 1, wherein the operating part is designed:
    for optically signaling several operating zones on the surface of the sensor module;
    for detecting a respective actuation of these operating zones; and
    for generating a respective actuation signal for the control components based on a detected actuation,
    wherein the operating part is designed for signaling no operating zones or a first number of operating zones when the operating part is inserted into the control housing and for signaling a second number of operating zones when the operating part is not inserted into the control housing, and wherein the second number of operating zones is greater than the first number of different actuation signals.

12. The furniture control according to claim 11, wherein the sensor module comprises a transparent touchscreen and a marking for the operating zones that can be signaled, and wherein the signaling is realized with the activation of a corresponding backlighting.

13. The furniture control according to claim 11, wherein the sensor module comprises a transparent touchscreen and a controllable graphic display for signaling the operating zones.

14. The furniture control according to claim 1, wherein the sensor module is designed for sensing a position of a touch actuation on the surface and for generating a respective actuation signal based on one or more sensed positions.

15. The furniture control according to claim 1 or 14, wherein the operating part comprises an electromechanical switching element that can be actuated by pressing on the surface of the sensor module, and wherein the operating part is designed for also generating the respective actuation signal for the control components based on a detected actuation of the switching element.

16. The furniture control according to claim 15, wherein the operating part is designed for generating a first actuation signal for the control components based on a detected touch actuation when the switching element is not actuated and for generating a second actuation signal for the control components when the switching element is actuated.

* * * * *